(12) United States Patent
Kell

(10) Patent No.: US 7,008,086 B1
(45) Date of Patent: Mar. 7, 2006

(54) ELECTRONICALLY CONTROLLED FLASHING LIGHT AND RF TRANSMITTER FOR ICE FISHING TIP-UPS

(76) Inventor: Curtis Kell, 35417 Oak Knoll Rd., Burlington, WI (US) 53105

( * ) Notice: Subject to any disclaimer, the term of this patent is extended or adjusted under 35 U.S.C. 154(b) by 0 days.

(21) Appl. No.: 10/696,352

(22) Filed: Oct. 29, 2003

(51) Int. Cl.
*F21S 8/00* (2006.01)
*F21S 13/10* (2006.01)

(52) U.S. Cl. .................. 362/431; 362/191; 43/17.5

(58) Field of Classification Search ............... 362/109, 362/119–120, 102, 157, 253, 191, 431; 43/17
See application file for complete search history.

(56) References Cited

U.S. PATENT DOCUMENTS

| | | | | | |
|---|---|---|---|---|---|
| 2,973,599 | A | * | 3/1961 | Olson | 43/17 |
| 3,359,673 | A | * | 12/1967 | Roemer | 43/17 |
| 3,879,880 | A | * | 4/1975 | Bailey | 43/17 |
| 4,437,255 | A | * | 3/1984 | Reed | 43/17 |
| 4,907,363 | A | * | 3/1990 | Dury | 43/15 |
| 4,996,788 | A | * | 3/1991 | Wieting et al. | 43/17 |
| 5,067,269 | A | * | 11/1991 | Eppley et al. | 43/17 |
| 5,097,618 | A | * | 3/1992 | Stoffel | 43/17 |
| 5,898,372 | A | * | 4/1999 | Johnson et al. | 340/573.2 |
| 5,979,101 | A | * | 11/1999 | Muenchow | 43/17 |
| 2002/0048169 | A1 | * | 4/2002 | Dowling et al. | 362/234 |
| 2003/0145508 | A1 | * | 8/2003 | Pieczynski | 43/17 |

* cited by examiner

*Primary Examiner*—Stephen Husar
*Assistant Examiner*—Jason Han
(74) *Attorney, Agent, or Firm*—Michael I. Kroll

(57) ABSTRACT

The present invention 10 discloses a fish strike indicator for ice fishing comprised of a base 20 of sufficient length to span the ice-fishing hole. A hook, line 24 and reel 64 mounted to an arm 62 is operatively connected to the platform 20 and a mast 14 having a flag 26 mounted thereto engaging the arm 62 whereby a fish strike of sufficient pressure causes the mast 14 to pop up. The mast 14 incorporates a tilt sensitive switch 54 engaging a power supply 48 selectively energizing a circuit 36 having a flashing light 34 forming an integral part therewith and optionally having an RF transmitter 50 integrally mounted within the circuit 36 for transmitting a signal to a remote receiver 22.

5 Claims, 14 Drawing Sheets

ELECTRONICALLY CONTROLLED FLASHING LIGHT AND RF TRANSMITTER FOR ICE FISHING TIP-UPS

BACKGROUND OF THE INVENTION

1. Field of the Invention

The present invention relates generally to sports equipment and, more specifically, to a fish strike indicator for ice fishing commonly referred to as a tip-up. The strike indicator is comprised of a base of sufficient length to span the ice-fishing hole. A hook, line and reel mounted to a switch operatively connected to the platform and extending into the hole and a mast having a flag mounted thereto and resiliently mounted to the platform for engaging said switch so as to cause said mast to pop up should a fish strike said hook with sufficient pressure to activate said switch.

The strike indicator of the present invention is a signaling device mounted to the platform having a tilt sensitive switch for engaging a power supply energizing a circuit having a flashing light forming an integral part therewith.

The present invention provides for an additional element in the form of a radio frequency transmitter integrally mounted within said circuit operatively engaged by said tilt sensitive switch.

2. Description of the Prior Art

There are other strike indicators device designed for fishing. Typical of these is U.S. Pat. No. 2,170,000 issued to Eggleston on Aug. 22, 1939.

Another patent was issued to Stelmach on Dec. 8, 1970 as U.S. Pat. No. 3,545,118. Yet another U.S. Pat. No. 4,183,076 was issued to Bodde on Jan. 8, 1980 and still yet another was issued on Mar. 13, 1990 to Dury as U.S. Pat. No. 4,907,363.

Another patent was issued to Everett on May 8, 1990 as U.S. Pat. No. 4,922,643. Yet another U.S. Pat. No. 4,928,419 was issued to Forrestal on May 29, 1990. Another was issued to Eppley et al. on Nov. 26, 1991 as U.S. Pat. No. 5,067,269 and still yet another was issued on Mar. 24, 1992 to Stoffel as U.S. Pat. No. 5,097,618.

Another patent was issued to Johnson et al. on Apr. 27, 1999 as U.S. Pat. No. 5,898,372. Yet another U.S. Pat. No. 5,979,101 was issued to Muenchow on Nov. 9, 1999. Another was issued to Frenette on Mar. 7, 1995 as Canadian Patent No. 1,334,625 and still yet another was issued on Jul. 30, 1997 to Taylor et al. as Canadian Patent No. 2,168,302.

Another patent was issued to Dirito, et al. on Nov. 6, 1997 as Canadian Patent No. 2,253,351. Yet another Canadian Patent No. 2,291,581 was issued to Buczkowski on Jun. 6, 2003. Another was issued to Mason on Dec. 14, 2000 as W.I.P.O. Patent No. Wo 00/74480.

U.S. Pat. No. 2,170,000

Inventor: Oscar P. Eggleston

Issued: Aug. 22, 1939

In a tip-up, an upright bar, means for supporting said bar partly immersed in water, a trigger lever pivotally carried by said bar on its portion below water and having a cam terminal portion on one end, said lever normally projecting laterally from said bar and having at its other end a hook portion adapted to receive a fish-line, signal means normally resiliently assuming actuated position when unrestrained, latch means cooperating with said signal means for holding said signal means in unactuated position when set, and means passing through the interior of said bar and engageable with and actuatable by said cam terminal portion of said lever for releasing said latch means and thereby releasing said signal means into actuated position.

U.S. Pat. No. 3,545,118

Inventor: John J. Stelmach

Issued: Dec. 8, 1970

Ice fishing apparatus comprising a flat substrate having a hole therethrough, means for generating heat on said substrate and directing the heat downwardly through the hole in the substrate for melting ice below a portion of the substrate, said heater means including a pot for burning charcoal, said pot having a tubular extension extending into said hole and spaced radially inwardly from a periphery of said hole, a reel supported by said substrate, and an indicator supported by said substrate, said indicator being responsive to rotation of the reel to thereby indicate that a fish has taken the bait on the line of the reel.

U.S. Pat. No. 4,183,076

Inventor: Egbert J. Bodde

Issued: Jan. 8, 1980

A tip-up light having no moving parts for use with ice fishing tip-ups.

U.S. Pat. No. 4,907,363

Inventor: Thomas P. Dury

Issued: Mar. 13, 1990

A signal apparatus is used in combination with a fishing rig. The rig includes a substantially upright mast and a normally straight resilient strip. The resilient strip has one end fixed near the top of the mast and another end releasably secured on the mast at a position to bow the mast. The signal apparatus includes a case having a lower cavity sized to receive the top of the mast to support the case. The case has a lateral cavity sized to receive a storage source of electrical energy. A pair of battery terminals is mounted at opposite ends of the lateral cavity. An electrical light is mounted atop the case. A switch is mounted laterally upon the case opposite the lateral cavity. The switch is serially connected with the electrical light and the pair of battery terminals. The switch has a laterally projecting, reciprocatable, electrically isolated actuator for operating the switch to close and open the circuit with the light and the battery terminals. The actuator is positioned to engage the resilient strip when it is secured in a bowed position and to open the circuit. The actuator is operable to close the circuit when the resilient strip is released to a substantially straight condition.

U.S. Pat. No. 4,922,643

Inventor: Charles J. Everett

Issued: May 8, 1990

A hollow illuminated fishing bobber of generally spherical shape, comprising two substantially hollow hemispherical shell members with cooperating joining means on each of the shell members for joining the shell members together to form the generally spherical shape and with an annular sealing member interposed between the shell members, a lamp member having elongated electrical leads, one of the shell members is adapted to be the upper member and has apertures therethrough for receiving the lamp leads. An elastic pocket member is disposed within the hollow bobber receiving a disc type battery therein having terminals on either side thereof where the lamp leads extend into the pocket member on either side of the battery and are frictionally held in contact with the battery by the pocket member. The two shell members are identical and each defines an inner annular shoulder adjacent the open ends thereof. The annular sealing member is disposed between the shoulders and the cooperating locking means on each of the shell members lock the shell members together with the sealing member compressively received therebetween, whereby the bobber is sealed against ingress of water therein.

U.S. Pat. No. 4,928,419

Inventor: Joseph M. Forrestal

Issued: May 29, 1990

An ice fishing apparatus and signaling device (10) includes a base (12), a fishing line (22) depending from the base (12) and having a hook (36) on its end, a trigger (38), a transmitter (60), and a receiver (62). An arm (42) is spring mounted to the base (12) such that it is movable from a trigger held horizontal position to a vertical position. The arm (42) moves from the horizontal position to the vertical upon a fish strike, thus engaging a switch (64) that completes a circuit that produces a radio signal from the transmitter (60) to the receiver (62).

U.S. Pat. No. 5,067,269

Inventor: David M. Eppley et al.

Issued: Nov. 26, 1991

A bias coil spring loaded ice fishing tip-up assembly having an indicator light consisting of a light bulb, two strand lead wires, a non conductive collar with a metal plate attached, a conductive collar and a battery clip. This assembly is attached to a movable strike indicator which, when activated by a trigger will cause the completion of a circuit, lighting the bulb intermittently at first, then becoming a steady source of light, signaling a fish strike.

U.S. Pat. No. 5,097,618

Inventor: Boyd A. Stoffel

Issued: Mar. 24, 1992

An electronic ice fishing system provides an enhanced alert to a fisherman of a fish strike. The electronic ice fishing system comprises an electric circuit with a radio transmitter and a magnetic reed switch encased in a weatherproof housing. The housing is attached to the frame of any of a number of conventional type fishing tipups. A ferrous plate is bonded to the housing proximate the magnetic reed switch inside. A magnet is placed on the ferrous plate, and the magnet actuates the magnetic reed switch to an open state. The magnet is tied with a cord to the flag alert of the tipup. When a fish strikes, the flag alert trips and pulls the magnet from the plate. As a result, the magnetic reed switch closes, and the radio transmitter is energized to signal a pager carried by the fisherman, who can be at a substantial distance and out of sight of his tipup. In a modified embodiment, the magnet and the plate are inverted. The magnet is captured inside the housing, and the plate is inserted into an external recess in the housing. The external recess is located between the magnet and the magnetic reed switch. When the plate is pulled from the housing recess by the tipup strike alert, the magnetic reed switch closes to energize the radio transmitter.

U.S. Pat. No. 5,898,372

Inventor: Randy D. Johnson et al.

Issued: Apr. 27, 1999

An illuminated fishing float with high intensity multi colored high intensity light emitting diodes signals fish activity beneath the float. When the float is activated a single color of light is emitted. When fish activity occurs beneath the float a flashing light is displayed. When a fish takes the bait the flashing light and the single color steady light are extinguished and a steady light of another color is displayed. The float is hollow and is composed of two sections which screw together.

U.S. Pat. No. 5,979,101

Inventor: Craig R. Muenchow

Issued: Nov. 9, 1999

A light system for an ice fishing tipup is removably attachable to the tipup flag arm. The light system includes an environmentally safe ball switch. When the flag arm is in a restrained mode, the ball switch is open to de-energize a lamp. When the flag arm releases upon a fish strike, the ball switch closes to energize the lamp. The light system includes a waterproof sleeve that encases the components. A lens in the sleeve generally surrounds the lamp. The sleeve is attached to the flag arm by flexible bands.

Canada Patent Number 1,334,625

Inventor: Murray M. Frenette

Issued: Mar. 7, 1995

A fishing device comprises a rod formed in two rod portions connectable at a center position by a coil spring attached to both of the rod portions. The coil spring is wrapped around the upper portion and is releasably attached to a cap on the lower portion which is of a larger diameter. A battery, speaker and fishing line are mounted on the lower portion. A hook is mounted on the upper portion at a position spaced from the upper end. A simple spring steel arm is fastened to one side of the lower portion and projects out beyond the end of the lower portion to position alongside the coil spring. With the fishing line attached to the hook on the upper portion, when the fishing line is pulled it distorts the upper portion and thus bends the spring into contact with the spring arm and this causes the completion of a circuit connecting the battery to the speaker. A spike at the lower end of the lower portion can be inserted into the ice adjacent an ice fishing hole. The spacing of the hook on the upper portion from its end enables the end to contact the ice on the side of the hole opposite the spike so that the unit cannot be pulled through the hole and lost.

Canada Patent Number 2,168,302

Inventor: Jared M. Taylor, et al.

Issued: Jul. 30, 1997

A fishing line sensor including a base, a shaft rotatably mounted to the base and a reel mounted to the shaft. The reel is rotatable relative to the base with the shaft. The reel is configured for winding and unwinding fishing line. A signaling device is mounted on the shaft and rotatable with the shaft and reel. The device includes a mercury switch switchable in response to rotation of the reel. An electronic signal producing element is activated in response to a switching of the mercury switch.

Canada Patent Number 2,253,351

Inventor: Anthony R. Dirito, et al.

Issued: Nov. 6, 1997

The present invention is a device for detecting the movement of a fish on a fishing line, which comes in two parts: a detecting and transmitting device (10) which can be attached to a fishing rod, and a receiving device (10) which also functions as a storage box. Movement of the fishing line is detected using a piezoelectric crystal or other sensing device. There is a rotatable control (34) for adjusting the sensitivity of the device. The sensing device produces an electric signal which is processed by electronic circuits, encoded, and transmitted as radio waves. The radio waves are received by the receiving device, converted back into an electric signal and decoded. When an appropriate signal is received, either a buzzer (64) or a vibrator (66) is activated to alert the user that a fish is on the line. A toggle switch (58) enables the user to choose whether the buzzer or the vibrator will be activated.

Canada Patent Number 2,291,581

Inventor: Andrzej Buczkowski

Issued: Jun. 3, 2001

An indicator is provided for detecting the motion of a fishing line on a fishing rod, and wherein the indicator is comprised of: a housing configured for mounting on a fishing rod, the housing having affixed thereto a rotatable wheel guide means, the outer edge of which has grooved means to engage the fishing line, and wherein at least a portion of the wheel means is composed of a magnetically detectable metal; a hollow detachable cylinder slidably mounted in the housing and disposed so that the center axis of the cylinder is essentially parallel to that of the rod, the cylinder containing a power supply and motion sensing means, the sensing means being located off center from the axis of the cylinder; the cylinder being rotatable about its axis whereby the motion sensing means is brought within sufficient proximity to the wheel guide means that any motion of the wheel is detectable and wherein the sensing means actuates both audible and visual signals to signify motion of the wheel guide means.

W.I.P.O. Patent Number WO 00/74480

Inventor: Robert Mason, et al.

Issued: Jun. 3, 2001

A fishing tip-up device is provided. A magnet holds a signaling device in a non-activated state. When an electronically operated sensor device senses movement of a fishing reel, a signal is sent to the magnet which causes the magnet to release the signaling device to indicate the occurrence of a possible fish strike. An annunciator turns on and off as a result of the sensing device sensing the rotation of the reel. The electrical circuit is activated when a fishing rod is properly positioned within a base frame of the fishing tip-up device. The electrical circuit is deactivated when the fishing rod is properly placed within the base frame for storage and transportation. The fishing tip-up can be manipulated into a single compact unit which is convenient for storage and transportation. A fishing reel is provided which creates drag in the unreeling of the fishing line when a fish takes off with the bait, thereby inhibiting the fish from unreeling the entire line.

While these fish strike indicators may be suitable for the purposes for which they were designed, they would not be as suitable for the purposes of the present invention, as hereinafter described.

SUMMARY OF THE PRESENT INVENTION

The present invention is a fish strike indicator for ice fishing comprised of a base of sufficient length to span the ice-fishing hole and a hook, line and spool mounted to a switch operatively connected to the platform and a mast having a flag mounted thereto engaging the switch whereby a fish strike of sufficient pressure causes the mast to pop up. The mast incorporates a tilt sensitive switch engaging a power supply selectively energizing a circuit having a flashing light forming an integral part therewith and optionally having a RF transmitter integrally mounted within the circuit for transmitting a signal to a remote receiver.

A primary object of the present invention is to provide a signal indicator for a tip-up comprising a mast having a flashing light mounted thereon.

Another object of the present invention is to provide a signal indicator wherein said flashing light is encompassed by a housing forming a distal end of said mast.

Yet another object of the present invention is to provide a signal indicator having a tilt-sensitive switch for selectively engaging said flashing light.

Still yet another object of the present invention is to provide a signal indicator having a circuit board mounted within said housing having said tilt-sensitive switch and said light mounted thereon with circuit means for flashing said light.

Another object of the present invention is to provide a signal indicator having a radio frequency transmitter incorporated into said circuit.

Yet another object of the present invention is to provide a handheld remote for receiving said transmitted signal.

Still yet another object of the present invention is to provide a signal indicator having a power supply mounted as an integral part of the mast.

Another object of the present invention is to provide a signal indicator having a power supply mounted to a platform having said mast operatively connected thereto.

Yet another object of the present invention is to provide a signal indicator having a mast wherein said mast has a throughbore with wires extending therethrough connecting said power supply and said circuit.

Still yet another object of the present invention is to provide a signal indicator having an on/off switch for said circuit.

Additional objects of the present invention will appear as the description proceeds.

The present invention overcomes the shortcomings of the prior art by providing a fish strike indicator for ice fishing comprised of a base of sufficient length to span the ice fishing hole. A hook, line and reel mounted to a switch operatively connected to the base and a mast having a flag mounted thereon and wherein said mast is resiliently mounted to said base and engaging said switch wherein said switch can cause said mast to pop up should a fish strike said hook with sufficient pressure to activate said switch.

Furthermore, the strike indicator provides a circuit mounted within a housing located at the proximal end of said mast having a circuit comprised of a tilt-sensitive switch, lamp and circuit means for flashing said lamp and a power supply mounted as an integral part of the mast or base.

Additionally the present invention provides an additional element in the form of a radio frequency transmitter for generating a signal and a handheld receiver for receiving said signal.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
FIG. 1 is an illustrative view of the present invention.

With regard to reference numerals used, the following numbering is used throughout the drawings.

10 present invention
12 light control assembly
14 flagpole
16 tip up
18 battery box
20 base
22 receiver
24 fishing line
26 flag
28 on/off switch
30 spring
32 flag pole engaging member
34 bulb
36 circuit board
38 top cover
40 bottom cover
42 screw
44 gasket
46 battery cover
48 batteries
50 transmitter circuitry
52 transmitter antenna
54 tilt switch
56 flasher circuitry
58 lamp socket
60 electrical wire
62 arm
64 spool
66 transistor
68 microcontroller
70 data control line

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

FIG. 1 is an illustrative view of the present invention 10. The present invention 10 combines an electronically controlled flashing light control assembly 12 and an RF transmitter in a miniature lightweight module or assembly that can be mounted at the top of the flagpole 14 of an ice fishing tip-up 16 fish strike indicator. The light control assembly 12 contains an illuminable device, a tilt-sensitive switch and circuit board for controlling the flashing of the illuminable device as well as the RF transmitter for use in conjunction with a remote receiver 22. The light control module 12 housing is constructed of a translucent material to maximize the luminance of the bulb. The light control module 12 has electrical power wires routed through the bore of the pole 14 to the battery box assembly 18. The battery box assembly 18 can be an integral part of the pole 14 or alternately an integral part of the tip-up base 20. The battery box 18 has switch means for engaging and disengaging the power to the light control head assembly 12.

Figure 2:
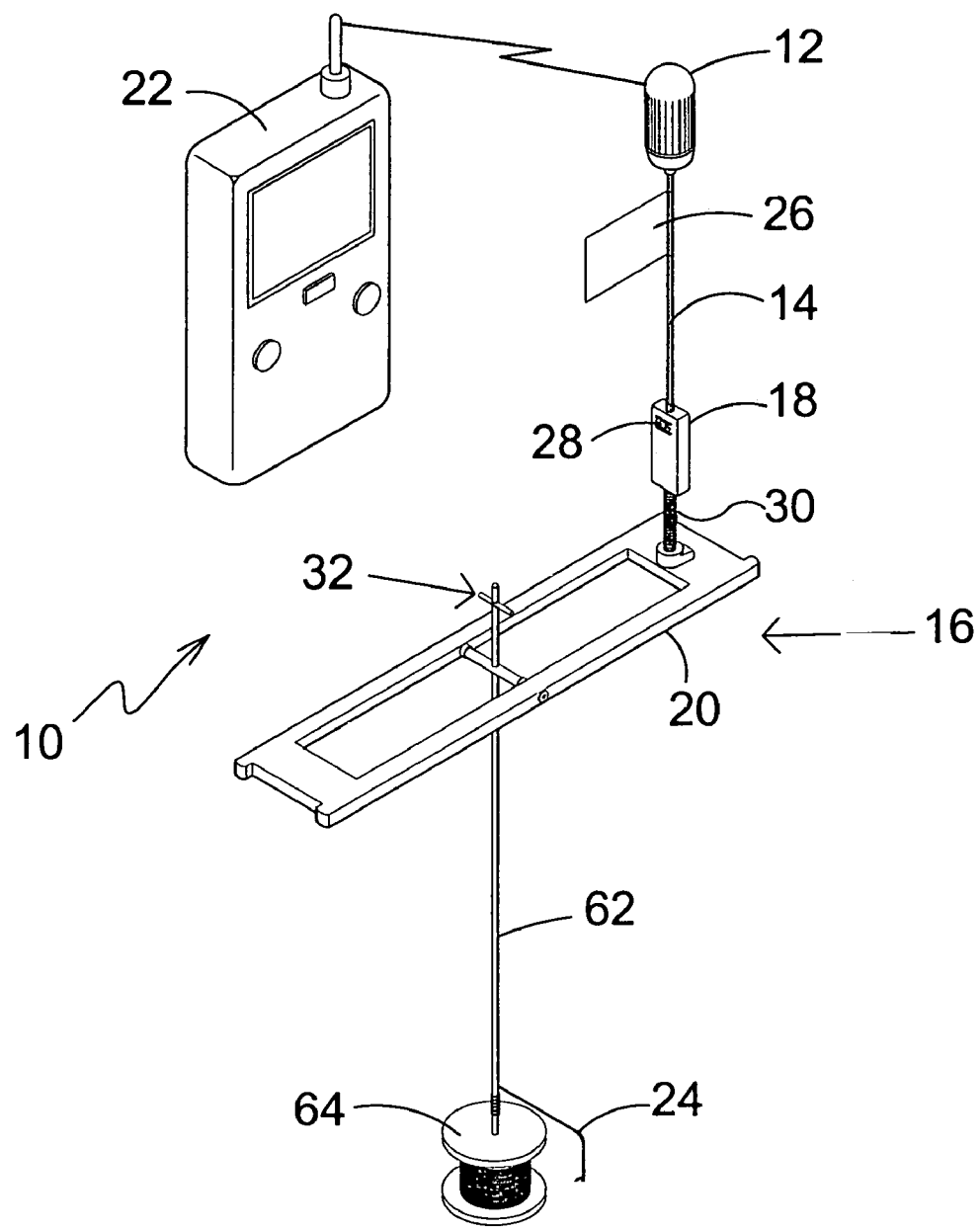
FIG. 2 is a perspective view of the tip-up of the present invention.

FIG. 2 is a perspective view of the tip-up 16 of the present invention 10. Shown is the tip-up 16 of the present invention 10 having a base 20 for securing a downwardly disposed swinging arm 62 with a spool 64 of fishing line 24 thereon for receiving a fish hook and manual strike indicator or flag pole 14 triggered by the fish strike. The strike indicator has a flag pole 14 engaging member 32 on the upper end of arm 62 and also incorporates electronic apparatus or light control assembly 12 that is engaged by a tilt-sensitive switch that illuminates at least one incandescent bulb or a plurality of light emitting diodes (LEDS). The circuit means of the light control assembly 12 incorporates components for creating a predetermined flashing sequence that is more visible than constant illumination. In addition, the light control assembly 12 of the electronic apparatus generates an RF transmission with an RF transmitter that can be received by a hand held remote receiver 22 module. Also shown are the flagpole 14 being a hollow tube, flag 26, battery box 18 with on/off switch 28 and spring 30.

Figure 3:
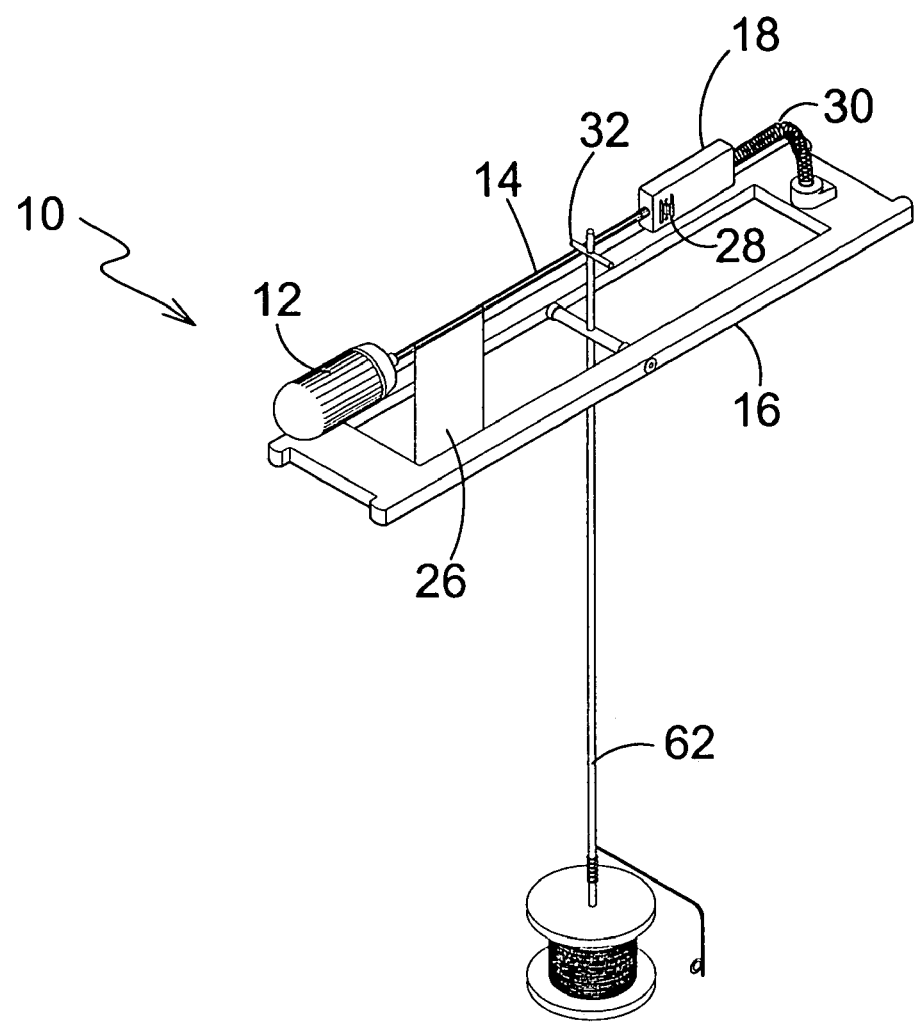
FIG. 3 is a perspective view of the tip-up of the present invention.

FIG. 3 is a perspective view of the tip-up 16 of the present invention 10. Shown is the tip-up 16 in the operative position wherein the strike indicator is held in a spring 30 tensioned position until such time as a fish causes the swingable flag pole engaging element 32 to move and disengage from the flag pole 14 whereupon the spring 30 propels the flag pole 14 into a vertical position marking the fish strike with a visible flag 26. The present invention 10 extends the ability of the tip-up to signal a strike by incorporating a light control assembly 12 having an electronic apparatus that illuminates a lamp or LEDs as well as transmit an RF signal to a remote receiver indicating a strike has occurred. Also shown are the flagpole 14, arm 62, battery box 18 and on/off switch 28.

Figure 4:
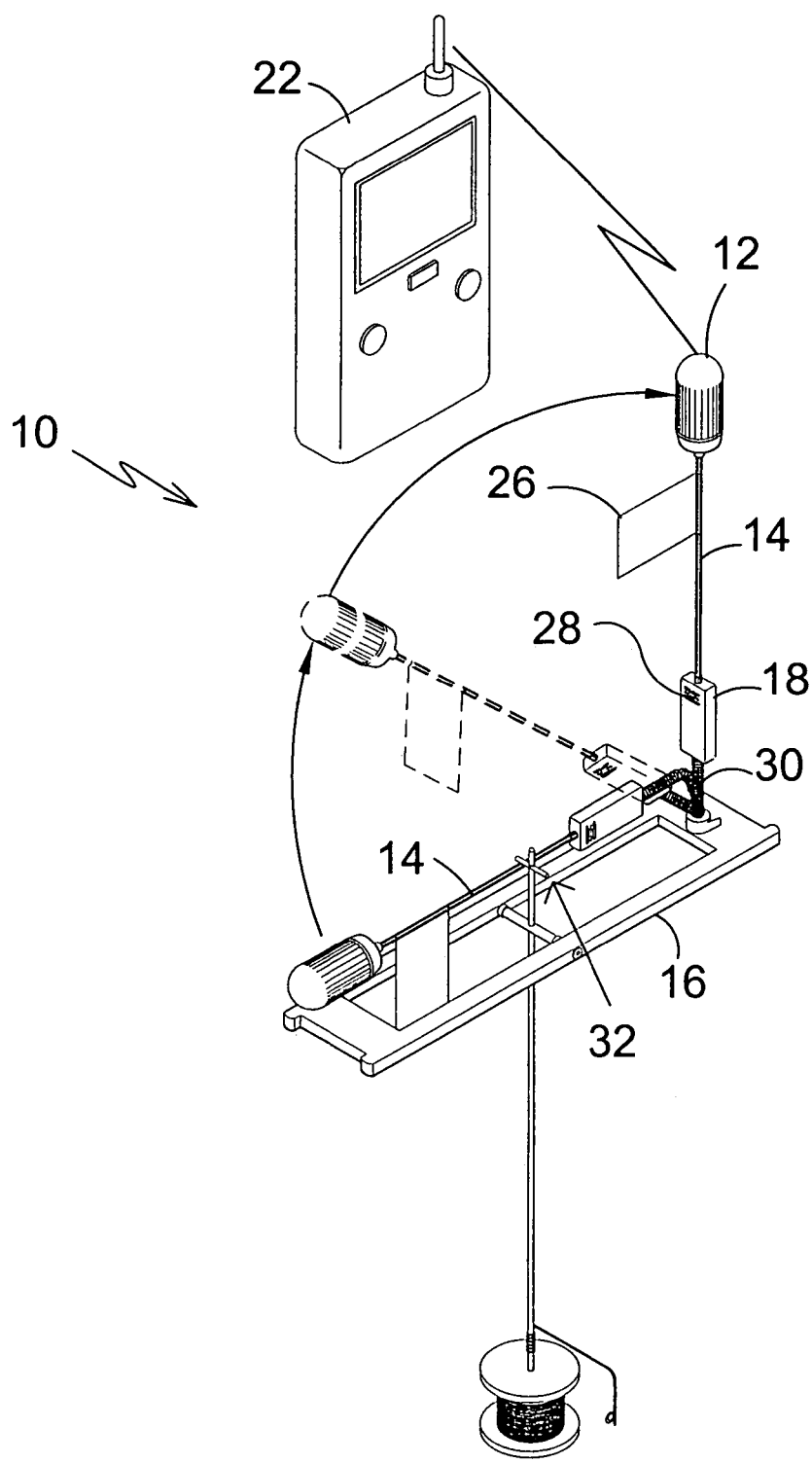
FIG. 4 is a perspective view of the engagement of the tip-up of the present invention.

FIG. 4 is a perspective view of the engagement of the tip-up 16 of the present invention 10. Shown is the tip-up 16 moving into an operative position. The strike indicator element 32 disengages from the flag pole 14 as the engaging member or catch 32 moves whereupon the spring 30 brings flagpole 14 of the tip-up into a vertical operable position. The electronic apparatus 12 having a tilt-sensitive switch which energizes the illuminable device causing it to flash while the RF transmitter generates a transmission that can be received by the receiver 22. Also shown are the flag 26, and battery box 18 with on/off switch 28.

Figure 5:
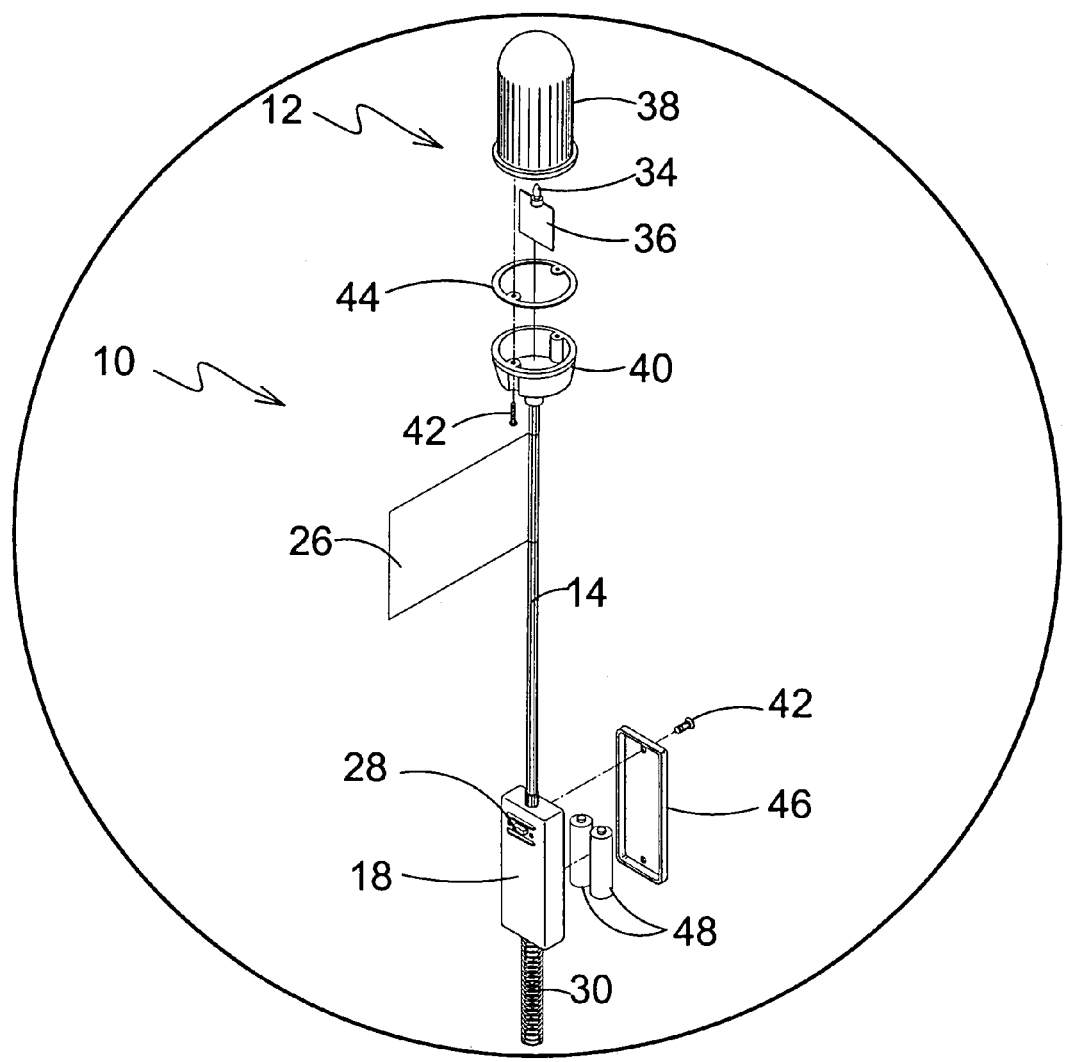
FIG. 5 is a detailed view of the present invention.

FIG. 5 is a detailed view of the present invention 10. Shown is the present invention being a tip-up light control assembly 12 comprising a bulb 34 and RF transmitter assembly on a circuit board 36 having a bulb 34 that is bright and replaceable by means of a bulb socket mounted on the circuit board 36. The light control head 12 contains a tilt or mercury switch or rolling ball style switch which activates the electronic circuitry when the flagpole 14 is tripped. Once activated by the tilt-sensitive switch, the circuitry 36 creates a flashing sequence by turning on the bulb 34 for a period of time, then off for a period of time. This sequence is repeated until either the tilt-sensitive switch is moved to such a position as to disable the circuitry or power is removed. While the lamp 34 is flashing, the RF transmitter circuitry sends periodic transmissions that can be received by a receiver. Also shown are top cover 38, bottom cover 40, a pair of screws 42, sealing gasket 44, flag 26, spring 30, battery cover 46 for batteries 48 in battery box 18 and on/off switch 28.

Figure 6:
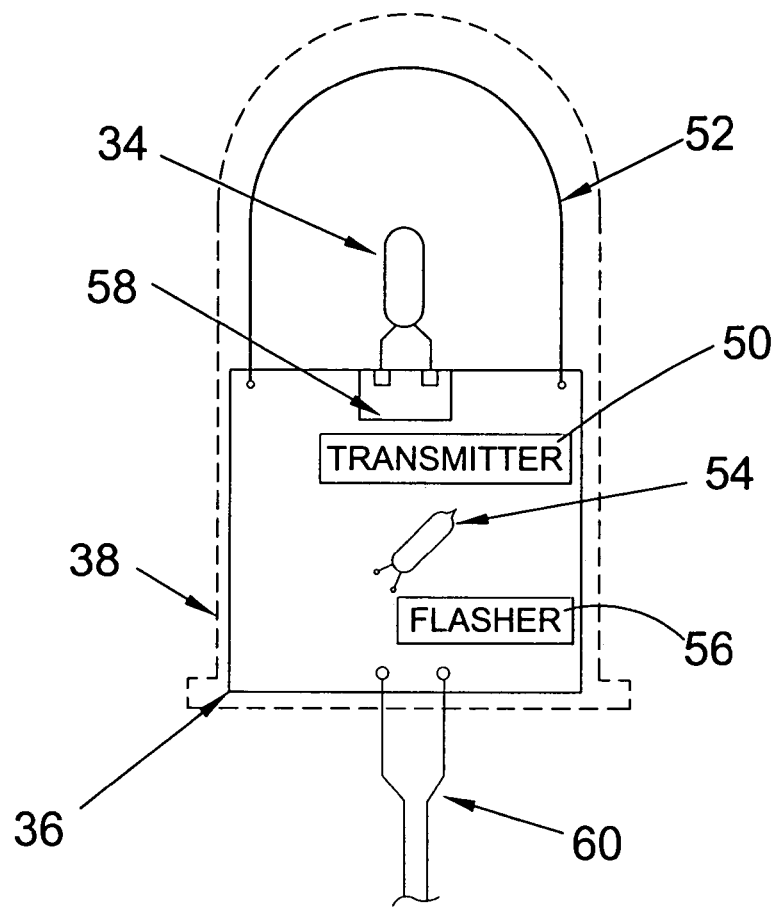
FIG. 6 is a diagram of the circuit board of the present invention.

FIG. 6 is a diagram of the circuit board 36 of the present invention. Shown is the circuitry of the present invention. The circuit board 36 contains all circuitry to control the flashing sequence of the lamp 34 and the RF transmitter 50. Also shown are the wire transmitter antenna 52, mercury or tilt switch 54, flasher 56, lamp socket 58, top cover 38, and electrical wire 60 which passes through the hollow flagpole at.

Figure 7:
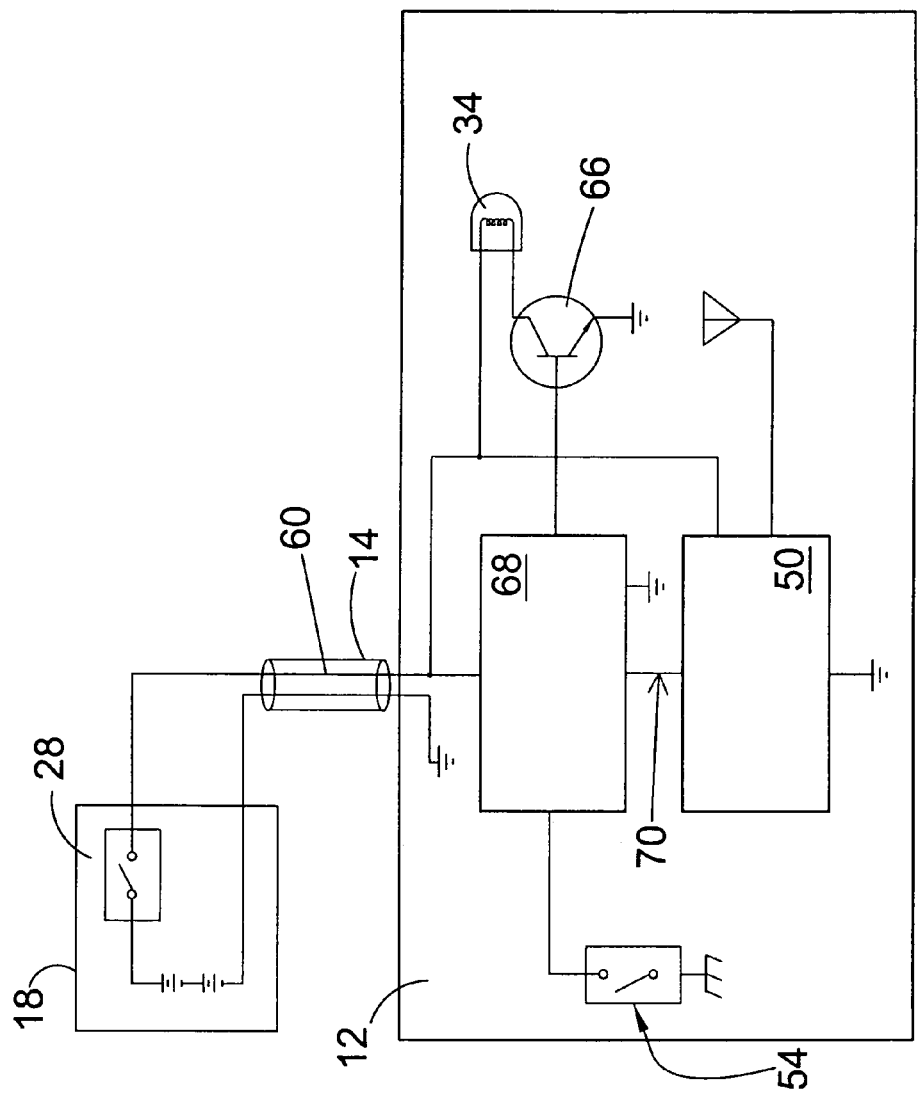
FIG. 7 is a circuit block diagram of the present invention.

FIG. 7 is a circuit block diagram of the present invention. Shown is the circuitry of present invention. The circuit board contains all circuitry to control the flashing sequence of the lamp 34 and to generate RF transmissions at 50. In addition to previously disclosed elements, also shown are transistor 66, microcontroller 68 which controls the light and RF data transmissions and date control line 70.

Figure 8:
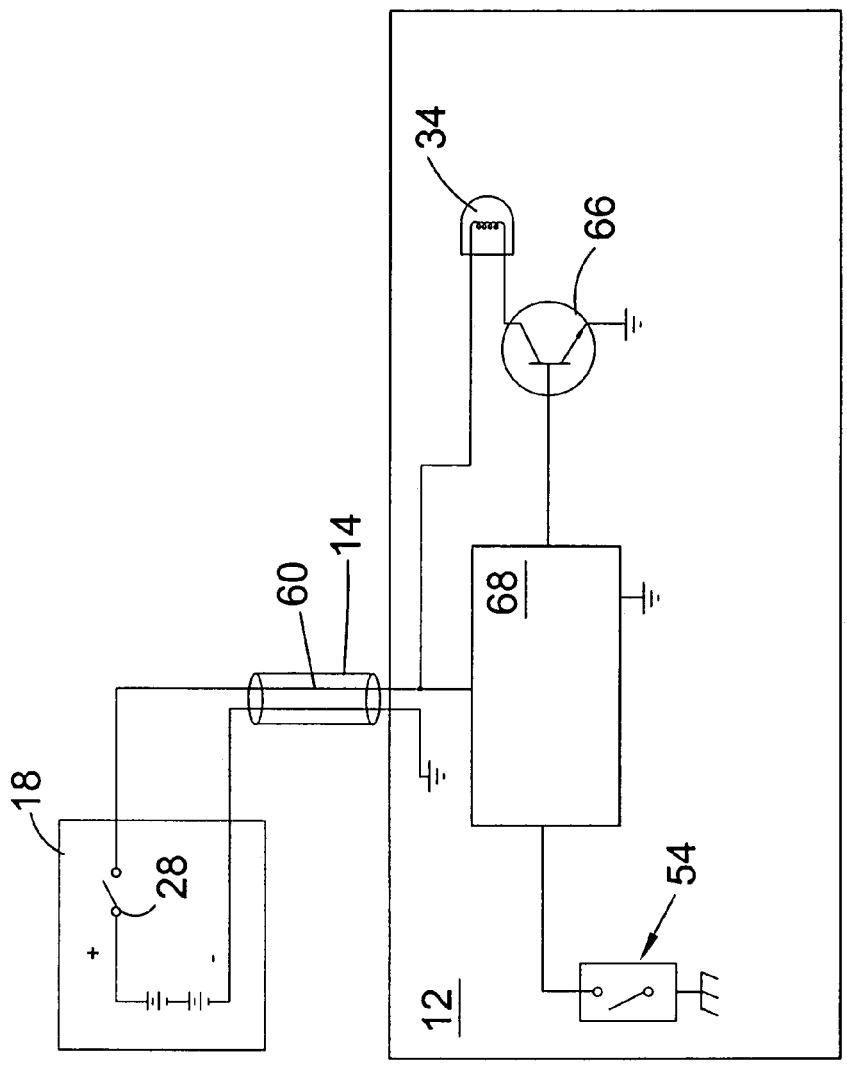
FIG. 8 is a circuit block diagram of the present invention when the RF transmitter function is not included.

FIG. 8 is a circuit block diagram of the present invention when the RF transmitter function is not included. Shown is the circuitry of the alternate device of the present invention when the RF transmitter functionality is not included. The circuit board controls the flashing sequence of the lamp 34. Once activated, the circuitry creates a flashing sequence by turning on the bulb 34 for a period of time and then off for a period of time. The sequence repeats until disabled.

Figure 9:
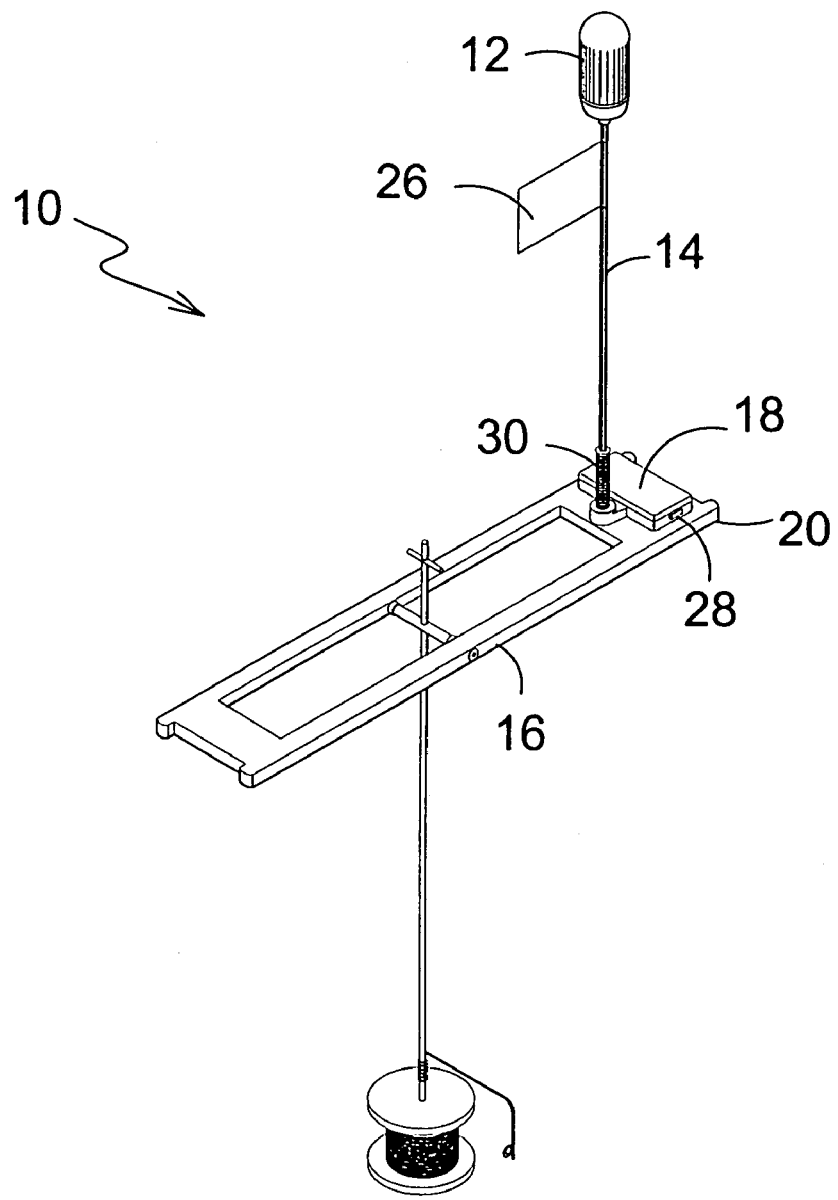
FIG. 9 is a perspective view of the alternate device of the present invention.

FIG. 9 is a perspective view of the alternate device of the present invention 10. Shown is an alternate device having a battery box 18 with on/off switch 28 that is an integral part of the tip-up 16 base 20 to provide a lower center of gravity. The flashing light sequence and RF transmissions are controlled by the electronic circuitry contained on the circuit board. When activated by the tilt-sensitive switch, the circuitry creates a flashing sequence by turning on the lamp for a period of time, then off for a period of time. While the lamp is flashing the RF circuitry sends periodic transmissions that can be received by the receiver, the sequence is repeated until the tilt-sensitive switch is moved to a reset position or power is disabled by the user. Other previously disclosed elements are also shown.

Figure 10:
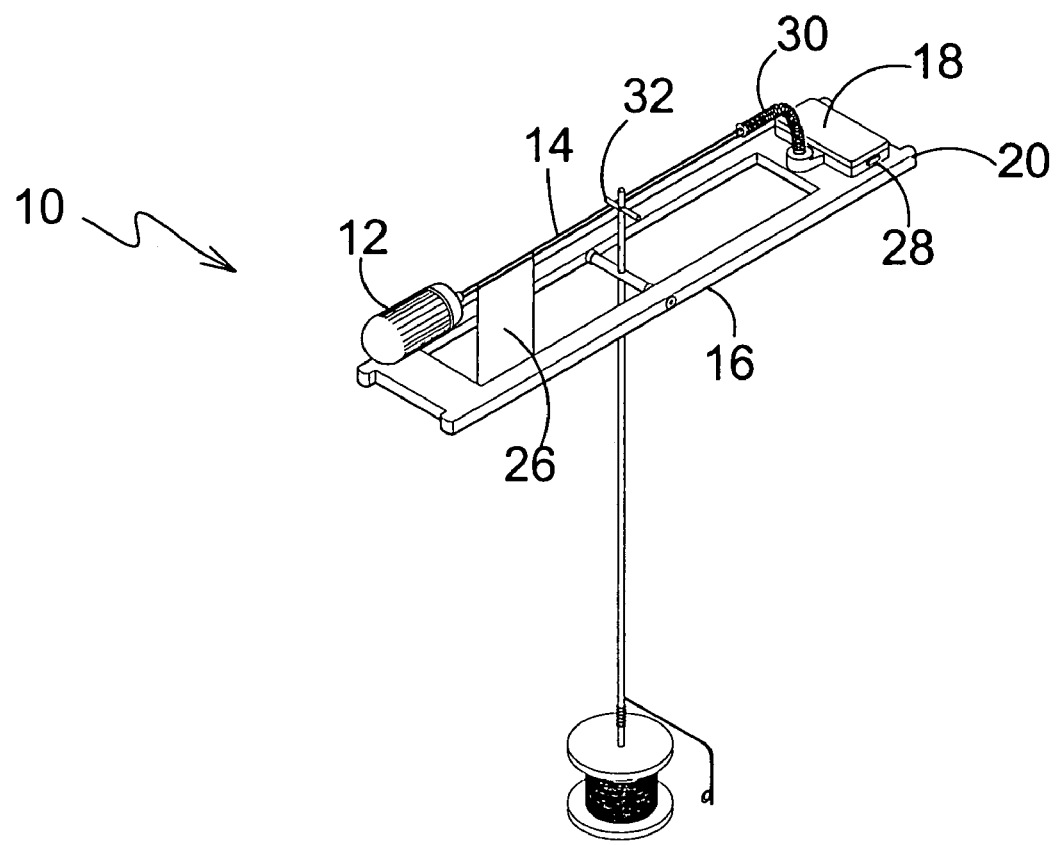
FIG. 10 is a perspective view of the alternate device of the present invention.

FIG. 10 is a perspective view of the alternate device of the present invention 10. Shown is an alternate device of the present invention 10 in the down position prior to a fish strike and having a battery box 18 that is an integral part of the tip-up 16 base 20 at a lower center of gravity and RF transmissions. The flashing light sequence is controlled by the electronic circuitry contained on the circuit board in the light control assembly 12. When activated by the tilt-sensitive switch, the circuitry creates a flashing sequence. While the lamp is flashing, the RF circuitry sends periodic transmissions that can be received by the receiver. The sequence is repeated until the tilt-sensitive switch is moved to a reset position or power is shut-off by the user. Other previously disclosed elements are also shown.

Figure 11:
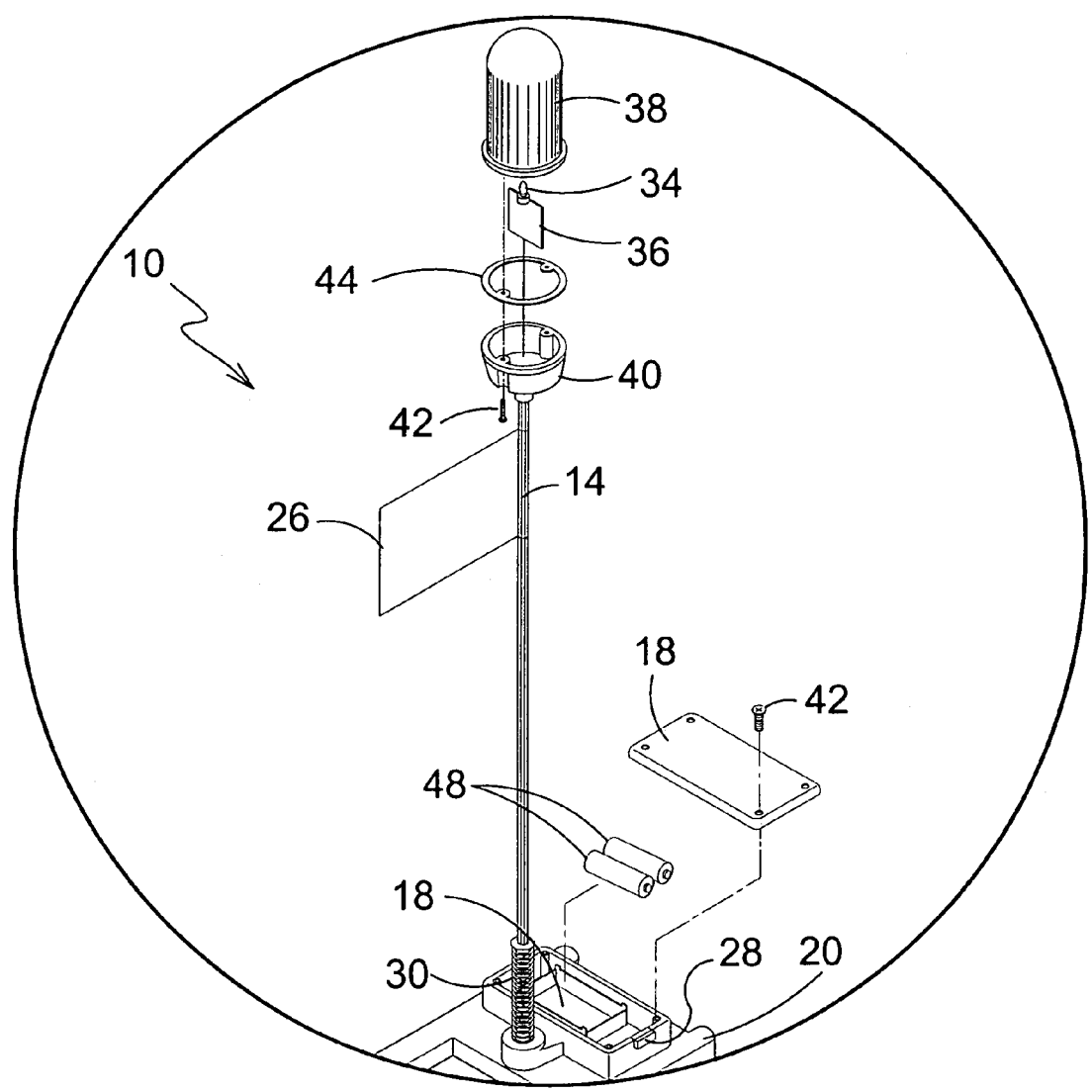
FIG. 11 is a detailed view of the alternate device of the present invention.

FIG. 11 is a detailed view of the alternate device of the present invention 10. Shown is an alternate device of the present invention 10, having a battery box 18 that is an integral part of the tip-up base 20. The flashing light sequence and RF transmissions are controlled by the electronic circuitry contained on the circuit board 36. When activated by the tilt-sensitive switch, the circuitry creates a flashing sequence. While the lamp 34 is flashing, the RF circuitry sends periodic transmissions that can be received by the receiver. The sequence is repeated until the tilt-sensitive switch is moved to a reset position or power is disabled by the user. Other previously disclosed elements are also shown.

Figure 12:
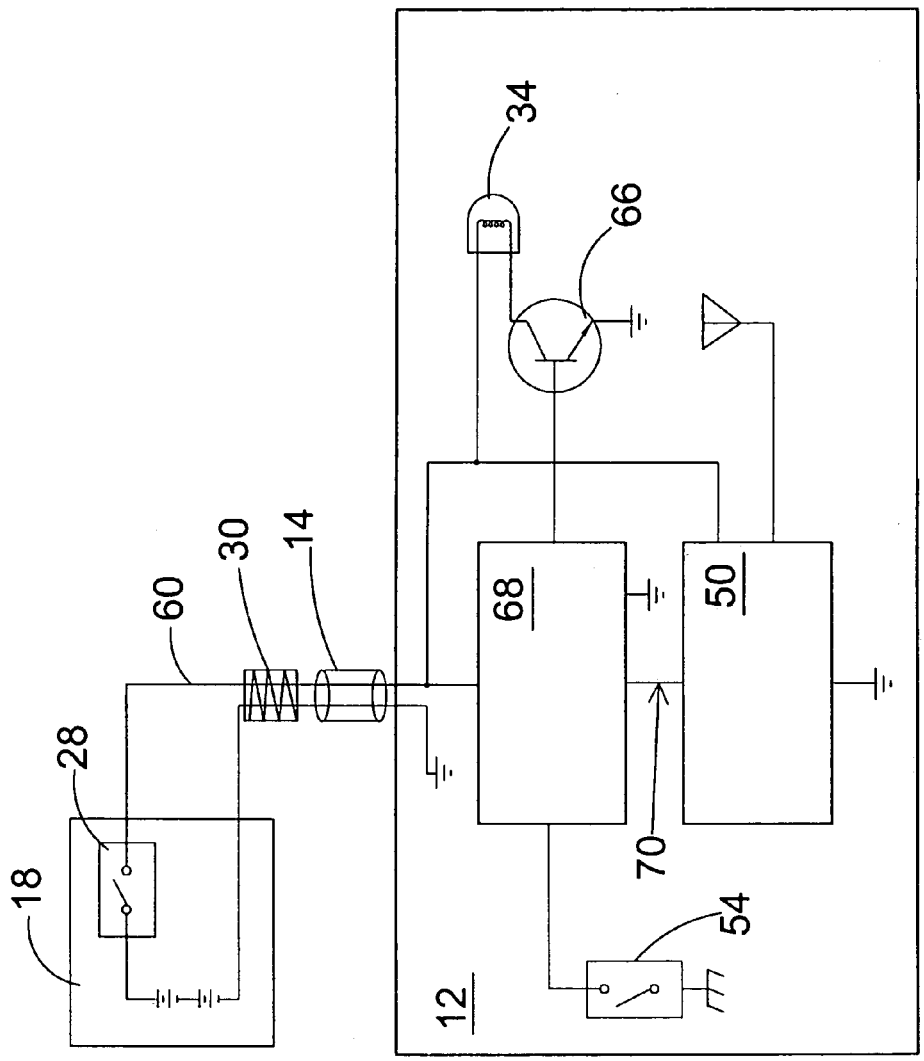
FIG. 12 is a circuit block diagram of the alternate device of the present invention.

FIG. 12 is a circuit block diagram of the alternate device of the present invention. Shown is the circuitry of the alternate device of the present invention. The circuit board contains all necessary circuitry to control the flashing sequence of the lamp 34 and the RF transmissions 50.

Figure 13:
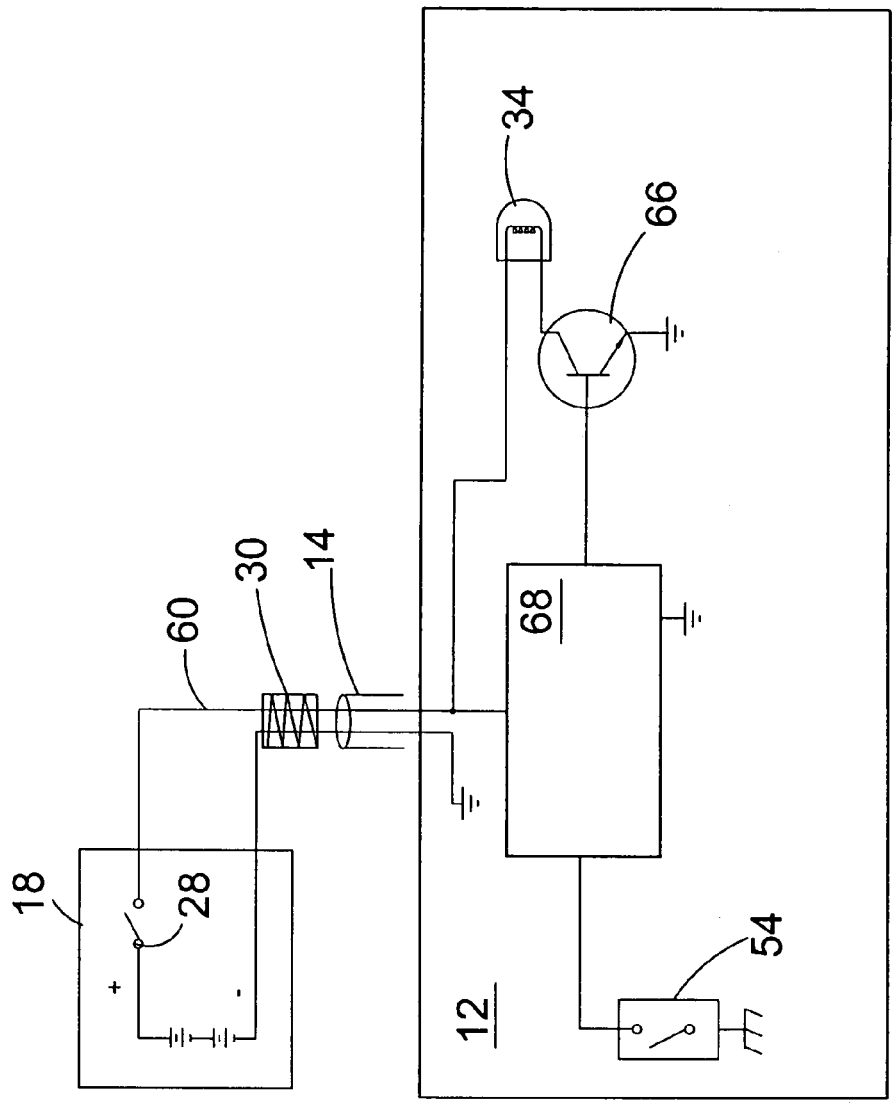
FIG. 13 is a circuit block diagram of the alternate device of the present invention when the RF transmitter function is not included.

FIG. 13 is a circuit block diagram of the alternate device of the present invention when the RF transmitter function is not included. Shown is the circuitry of the alternate device of the present invention. When the RF transmitter functionally is not included, the circuit board controls the flashing sequence of the lamp 34. Once activated, the circuitry creates a flashing sequence by turning on the bulb 34 for a period of time and then off for a period of time. The sequence repeats until disabled.

Figure 14:
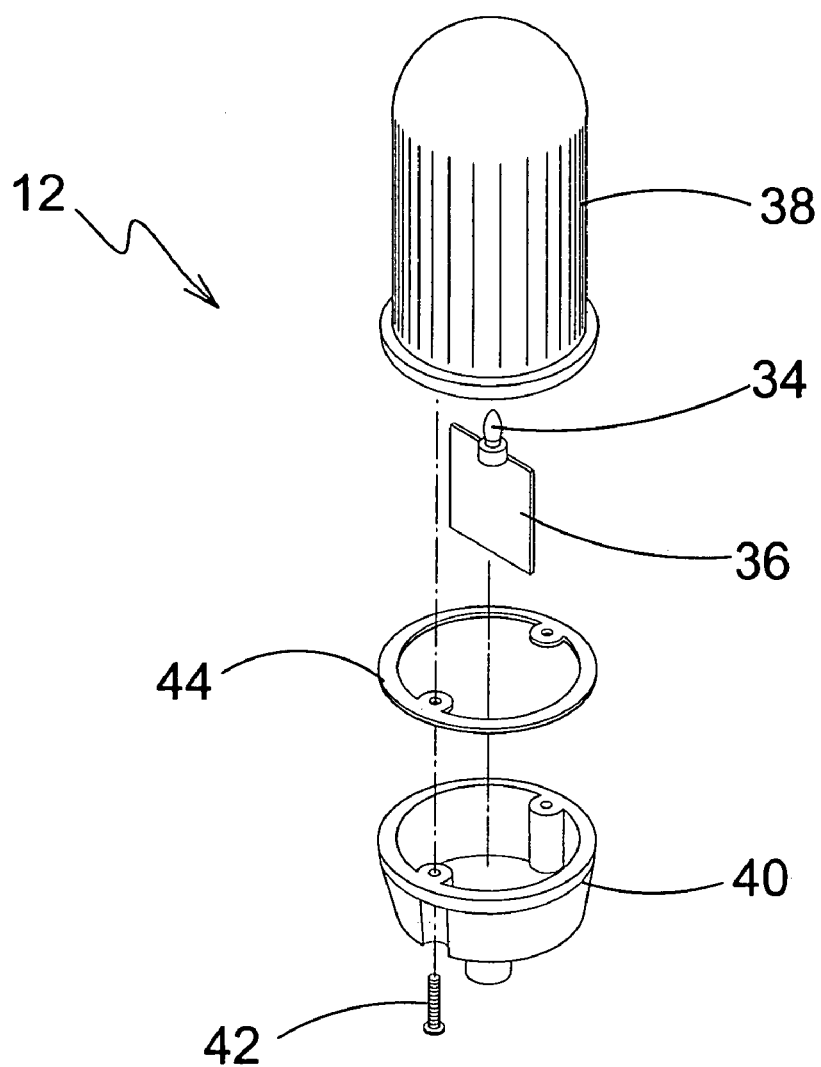
FIG. 14 is a detailed view of the present invention.

FIG. 14 is a detailed view of the present invention. Shown is the present invention being a tip-up light and RF transmitter assembly 12 having a bulb 34 that is bright and replaceable by means of a bulb socket mounted on the circuit board 36. The bulb control head 12 contains a tilt or mercury switch or rolling ball style switch which activates the electronic circuitry when the flag is tripped. Once activated by the tilt-sensitive switch, the circuitry creates a flashing sequence by turning on the bulb 34 for a period of time, then off for a period of time. While the lamp 34 is flashing the RF circuitry sends periodic transmissions that can be received by the receiver. This sequence is repeated until either the tilt-sensitive switch is moved to such a position as to disable the circuitry or power is removed. Other previously disclosed elements are also shown.

I claim:

1. An apparatus for attachment to an ice fishing tip-up for signaling to a fisherman that a fish strike has occurred comprising:
    a) a tip-up for use when ice fishing, said tip-up having an elongated base for spanning an ice fishing hole, said base having first and second opposing ends, an elongated flag pole disposed on said first end of said base, said flag pole having first and second opposing ends, wherein said second end of said flag pole is resiliently movably mounted to said first end of said base to permit movement of the flagpole from a substantially vertical position to a substantially horizontal position, an elongated downward extending arm disposed intermediate said base, said arm having first and second opposing ends, a flag pole engaging member being disposed on said first end of said arm so that said flag pole is held in a substantially horizontal position when engaged by said member, wherein said arm has a fishing line with a hook attached thereto disposed on said second end of said arm, wherein said first end of said arm is movable by the action of a fish striking the hook, wherein said flagpole is disengaged from said flag pole engaging member by the movement of said first end of said arm, wherein said flag pole moves to a substantially vertical position when disengaged from said flag pole engaging member;
    b) a light assembly disposed on said first end of said flag pole comprising a top cover having a bottom opening and a hemispherical shape at a top thereof and a bottom cover enclosing said bottom opening, said top containing a circuit board with a light bulb mounted thereon;
    c) means for supplying electrical power to said light when said flag pole moves from a horizontal position to a vertical position including a tilt switch in said circuit board;
    d) a wireless RF signal transmitter mounted on said circuit board for transmitting a wireless RF signal to a remote receiver when said light is powered, said transmitter having an antenna connected to said circuit board on opposite sides of said light in the form of a loop corresponding to the hemispherical shape of said top cover;
    e) a flag mounted on said flag pole beneath said light assembly;
    f) said means for supplying electrical power consisting of a battery assembly containing a battery connected electrically to said tilt switch, said battery assembly having an on/off switch.

2. The apparatus of claim 1, wherein said light is a flashing light.

3. The apparatus of claim 2, further having a microcontroller being disposed in said electronic circuit for controlling said light and said transmitter.

4. The apparatus of claim 3, wherein said electrical interconnection includes said flag pole having a bore therein, wherein electrical wires pass through said bore to connect said light to said battery.

5. The apparatus of claim 4, wherein the second end of said flag pole includes a spring so that the flag pole is resiliently mounted to said base.

* * * * *